US009016497B2

(12) United States Patent
Karhu et al.

(10) Patent No.: US 9,016,497 B2

(45) Date of Patent: Apr. 28, 2015

(54) METHOD FOR FORMING A PACKAGE, A PACKAGE AND A PACKAGE BLANK

(75) Inventors: Teemu Karhu, Lahti (FI); Timo Myllys, Lahti (FI); Olav Pirttiniemi, Järvelä (FI); Aimo Ojava, Lahti (FI); Päivi Määttä, Lappila (FI); Jalliina Järvinen, Lahti (FI)

(73) Assignee: Stora Enso OYJ, Helsinki (FI)

( * ) Notice: Subject to any disclaimer, the term of this patent is extended or adjusted under 35 U.S.C. 154(b) by 0 days.

(21) Appl. No.: 13/816,636

(22) PCT Filed: Aug. 25, 2011

(86) PCT No.: PCT/IB2011/053730

§ 371 (c)(1), (2), (4) Date: Feb. 12, 2013

(87) PCT Pub. No.: WO2012/025898

PCT Pub. Date: Mar. 1, 2012

(65) Prior Publication Data

US 2013/0146608 A1 Jun. 13, 2013

(30) Foreign Application Priority Data

Aug. 26, 2010 (SE) ...................................... 1050874

(51) Int. Cl.

*B65D 1/40* (2006.01)
*B65D 1/00* (2006.01)

(Continued)

(52) U.S. Cl.

CPC ... *B65D 1/40* (2013.01); *B31B 1/00* (2013.01); *B31B 2201/22* (2013.01); *B31B 2201/6008* (2013.01); *B65D 1/34* (2013.01); *Y10S 229/93* (2013.01)

(58) Field of Classification Search

USPC .......... 220/657, 62, 62.1, 604, 675, 607, 574; 264/320; 428/34.2; 229/406, 407, 930

See application file for complete search history.

(56) References Cited

U.S. PATENT DOCUMENTS 3,414,181 A * 12/1968 Sloan ............................ 229/406
3,680,733 A * 8/1972 Winslow ....................... 220/642

(Continued)

FOREIGN PATENT DOCUMENTS

EP 1289856 11/2003
JP 2003175924 6/2003

(Continued)

OTHER PUBLICATIONS

International Search Report of the ISA/SE, dated Dec. 13, 2011.

*Primary Examiner* — Fenn Mathew
*Assistant Examiner* — Jennifer Castriotta
(74) *Attorney, Agent, or Firm* — Greer, Burns & Crain, Ltd.

(57) ABSTRACT

The present invention relates to a method for forming a package by moulding a cardboard blank in such a manner that a margin area (2) of the blank, surrounding a middle portion (1) of the blank, is bent upwards to form side walls of the package while the middle portion forms a bottom of the package. The cardboard blank prior to moulding is provided with at least one area (4) of reduced bending stiffness being located in a transition zone (3) between the side walls and the bottom. The package is moulded from the blank so that the at least one area (4) of reduced bending stiffness is located in the bended areas between the side walls and the bottom and extend in the running direction of the bend. The invention further relates to a package and a package blank that can be used for forming said package.

24 Claims, 1 Drawing Sheet

(51) Int. Cl.

| | |
|---|---|
| ***A47G 19/02*** | (2006.01) |
| ***A47G 23/06*** | (2006.01) |
| ***B29C 59/02*** | (2006.01) |
| ***B31B 1/00*** | (2006.01) |
| ***B65D 1/34*** | (2006.01) |

(56) References Cited

U.S. PATENT DOCUMENTS

| | | | | |
|---|---|---|---|---|
| 3,792,809 | A | 2/1974 | Schneider et al. | |
| 5,230,939 | A | 7/1993 | Baum | |
| 5,236,119 | A * | 8/1993 | Chu | 229/407 |
| 5,425,972 | A | 6/1995 | Calvert | |
| 6,093,460 | A * | 7/2000 | Iwaya | 428/34.2 |
| 8,011,568 | B2 * | 9/2011 | Maeaettae et al. | 229/407 |
| 2004/0262322 | A1 | 12/2004 | Middleton et al. | |
| 2005/0269324 | A1 * | 12/2005 | Terashima et al. | 220/62.1 |
| 2007/0290027 | A1 * | 12/2007 | Maatta et al. | 229/123.1 |
| 2009/0152333 | A1 * | 6/2009 | Maeaettae et al. | 229/104 |

FOREIGN PATENT DOCUMENTS

| | | | |
|---|---|---|---|
| SE | 340746 | | 11/1971 |
| WO | 0021854 | | 4/2000 |
| WO | 03033258 | | 4/2003 |
| WO | 2007036598 | | 4/2007 |
| WO | 2009074721 | A1 | 6/2009 |

* cited by examiner

METHOD FOR FORMING A PACKAGE, A PACKAGE AND A PACKAGE BLANK

This application is a U.S. National Stage under 35 U.S.C. §371 of International Application No. PCT/IB2011/053730, filed Aug. 25, 2011, which claims priority from Swedish Patent Application No. 1050874-5, filed Aug. 26, 2010.

FIELD OF THE INVENTION

The invention relates to a method for forming a package, wherein the package is moulded from a cardboard blank in such a manner that a margin area of the blank surrounding a middle portion of the blank is bent upwards to form side walls of the package while the middle portion forms the bottom of the package. The invention further relates to a package and a package blank that can be used for forming said package.

BACKGROUND OF THE INVENTION

A commonly used package for keeping food is a so-called tray package. The tray package is often closed hermetically with a lid. In order to attach the lid to the package, the edge of the package must be equipped with a horizontal rim or edge flange extending from the upper end of the side walls and encircling the package. The upper surface of this flange normally comprises a suitable coating, by means of which the lid can be attached to the package tightly. Examples of food packages of this type, package materials used therein, and methods for forming packages are disclosed, inter alia, in documents WO 03/033258, EP 1 289 856, WO 00/21854, U.S. Pat. No. 5,425,972, WO 03/078012 (corresponding US application 2004/0262322), WO2007/036598 and WO2009/074721.

The above-described tray package is normally formed of a flat blank by pressing it to shape in a mould. The starting material is in a flat shape, that is, extending in one single plane before it is processed by mechanical deforming in the moulding operation to a tray package. Cardboard materials, which are commonly used for such trays, have a sort of memory effect which tend to restore the package tray just formed back to the original flat shape by bending the side walls outwards. Even though the horizontal edge flange or rim stiffens the structure to some extent, there may be slight deformation, called “warping”, in the final package. This shows as a slightly convex shape of the upper surface of the rim.

Apart from being a visual defect, the curved shape of the rim may give technical problems during sealing of the lid to the tray package.

WO2009/074721 describes a tray package which has a plastic flange joined to the upper edge of the side walls of a cardboard tray by injection moulding. The rim made in this way makes the tray rigid and enables easier sealing of the lid. However some plastic materials may shrink a little when solidifying in comparison to the cardboard material, which creates internal forces and consequently curving of the rim.

There is thus a need for a moulded package which overcomes the above mentioned problem with curving of the rim, i.e. warping.

SUMMARY OF THE INVENTION

It is an object of the invention to provide a method for forming a package by moulding of a flat blank, which package will have an improved shape, i.e. a minimally distorted shape. It is also an object of the present invention to provide a package with improved shape. Another object with the present invention is to provide a package blank that can be used in the manufacture of a package with improved shape as a result.

These aims and other advantages are achieved by the method according to claim 1. The present invention relates to a method for forming a package from a cardboard blank said blank comprises a margin area surrounding a middle portion, the package is moulded from the cardboard blank, so that the margin area is bent upwards forming side walls of the package while the middle portion forms the bottom of the package, wherein the blank prior to moulding is provided with at least one area of reduced bending stiffness being located around the middle portion of the blank, and the at least one area of reduced bending stiffness is being located in a transition zone, between the side walls and the bottom, where the blank is deformed due to moulding.

The at least one area of reduced bending stiffness is preferably located at a distance from an outer edge of the blank. The transition zone where the at least one area is being located, is the bended area between the side walls and the bottom. The at least one area of reduced bending stiffness is thus preferably located in the bended area between the side walls and the bottom and the area preferably extend parallelly to the running direction of the bend.

Thus, the at least one area of reduced bending stiffness will be situated in the moulded package in the area where the blank material is deformed due to moulding and is subjected to internal stresses which are caused by the tendency of the margin area of the moulded package to return to its original state. Providing the blank with at least one area of reduced bending stiffness will release the internal stress of the formed package.

It is preferred to provide the package with more than one area of reduced bending stiffness, preferably two, three, four or even more areas. The number of areas depends on the shape of the formed package and on how high the internal stress of the package is. The areas are preferably separated from each other.

By creating areas of reduced bending stiffness in those places of the blank which in the finished tray-shaped package will be in the transition zone between the bottom and side walls (i.e. areas where the blank material is bent in the forming process), it is possible to release the internal stresses which build up because of the above-mentioned memory effect of cardboard material and shrinkage of the rim. The deformation of the package can in this way be decreased or totally eliminated. These areas can be elongated areas of predetermined width that run parallelly to the straight sides of the blank. In a blank with general rectangular shape there is preferably four such areas: two in parallel with the shorter sides and two in parallel with the longer sides.

In practice the said areas can be made weaker by making the areas thinner compared with the rest of the blank material on their both sides. This can be performed by creasing, which reduces the thickness of the blank material. Creasing is an operation where the cardboard material is locally pressed to be flattened so that the board layers are separated and bending resistance decreased.

The areas of reduced bending stiffness do not by themselves cause bending or folding of the blank material during the moulding operation, but they, together with the rest of the blank material, conform to the bent shapes determined by the forming tool, and remain in these shapes as the areas will relieve the internal stresses. The width of these areas perpendicularly to the bending direction can be over 1 mm, preferably over 2 mm, and especially in the range of 2.5-4.0 mm. For example, by using multiple parallel creasing blades, a desired width of the area can be achieved. Narrow areas of reduced bending stiffness, which have the width of a conventional crease (around 0.7 mm) normally used for forming folds in cardboard material along predetermined lines, are not usually able to release internal stresses of the package in a satisfied way. However, the size of the area with reduced bending stiffness also depends on the size of the package. It might be sufficient to provide small packages with areas of reduced bending stiffness of below 1 mm, for example around 0.7 mm.

The package may also be provided with a horizontal edge flange or rim, being formed on the upper edge of the sidewalls of the package wherein the flange is made from a different material than the cardboard blank, preferably from plastic material.

The invention further relates to a package wherein the package is formed of a blank comprising at least one area of reduced bending stiffness in the transition zone between the bottom of the package and the side walls of the package where the blank material is deformed due to moulding.

The package may also comprises a horizontal edge flange or rim which is directed from the upper edge of the sidewalls outwards, approximately in a plane parallel with the original plane of the blank. This edge flange or rim can be made of the same cardboard blank material as the rest of the package in the moulding operation. According to an advantageous embodiment, this flange or rim can be made of different material, such as plastics, and joined to the upper edge of the side walls of the package. The process of forming a separate plastic flange in a final stage of the moulding operation by injecting plastic material is described in international publication WO2009/074721.

The present invention further relates to a package blank of planar shape wherein the blank comprises at least one area of reduced bending stiffness.

BRIEF DESCRIPTION OF THE DRAWINGS

In the following, the invention will be described with reference to the appended drawings, in which.

DETAILED DESCRIPTION OF THE INVENTION

The term “package” shall in this context mean either a closed package or an open package capable of taking a product to be packed and the package should be closable by a lid or similar closure.

Figure 1:
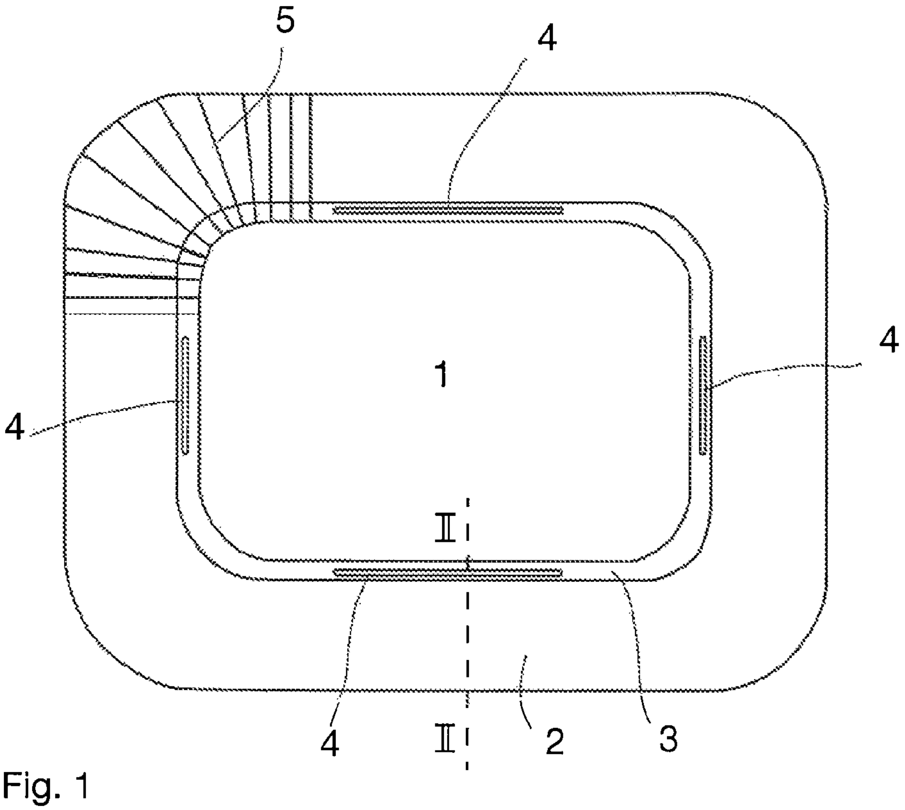
FIG. 1 shows a blank before moulding in top plan view.

The blank shown in FIG. 1 is a cardboard blank where the cardboard may be coated on one side, both sides or it may be uncoated. If the package made of the blank is for packaging food products, the coating on the blank may be a barrier material giving the blank barrier properties, for example a barrier against liquid, vapor, grease etc. The coating may consist of one layer or it can have two or several layers. Coatings used in cardboard packaging materials are widely known and they are not discussed in further detail in this context.

The blank is of general rectangular shape with successive straight sides and rounded corners at its outer edge, which is a widely used shape for tray-type containers. The blank has a middle portion 1 which is surrounded by a margin area 2 which is outwardly limited by the outer edge of the blank. The corners of the margin area 2 comprise radially extending score lines 5, or the like known as such, which will help to form the corners of the package during the molding operation.

The moulding operation where the package is formed from the blank is preferably a compression molding using a press tool which deforms the blank and urges it to the final shape. The package obtains its final shape when the cardboard blank is pressed between two mould halves. During this operation the margin area 2 will be bent upwards from the middle portion 1 which retains its original orientation and forms the bottom of the package. The margin area 2 will form the side walls of the package around the bottom, limiting the inner volume of the package laterally in all directions. Due to the moulding operation the transition zone 3 between the middle portion 1 and the margin area 2 will undergo bending deformation in a direction perpendicular to the plane of the blank. This zone 3, where the side walls connect to the bottom, will have a curved shape seen in vertical cross-section of the package. To reduce or eliminate internal stresses caused by this deformation, the transition zone 3 contains elongated areas 4 of reduced bending stiffness. In the blank shown in FIG. 1 there are four such areas 4 around the middle portion 1, two in parallel with the shorter sides of the blank and two in parallel with the longer sides of the blank. The areas 4 are of limited length and separate from each other in the circumferential direction. They extend in parallel with the straight sections of the short sides and long sides of the blank, but they do not continue till the curved corner sections, i.e. they are discontinuous. By separating the areas of reduced bending stiffness it is possible to optimize the size, such as length, thickness and width, of the areas in a more effective way since the size of each area can be made different. In this way a more flexible and efficient way of reducing or even eliminating the deformation of the package can be achieved.

Figure 2:
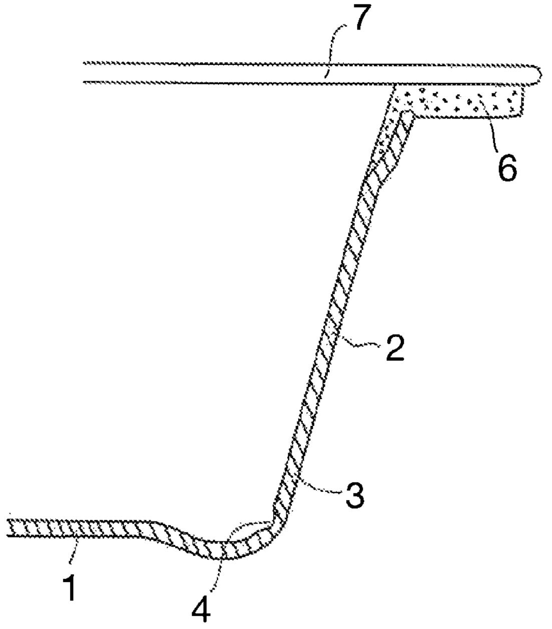
FIG. 2 is a vertical partial cross-section of a package after moulding, along a plane which is shown by line II-II in the blank of FIG. 1.

FIG. 2 illustrates the location of the area 4 of reduced bending stiffness in the moulded package, which is a so called tray-type container. The figure shows the side wall, the bend between the side wall and the bottom, and part of the bottom. The area 4 of reduced bending stiffness extends along the running direction of the bend. The running direction of the bend is the direction where the cross-section of the bend remains constant and it corresponds to the direction of the transition zone 3 in the blank. The area 4 is in the bend preferably in an angular position of about 40-50°, preferable about 45°, down from the horizontal, that is, where the radius connecting the centre of curvature of the bend and the area 4 forms an angle of about 40-50° with the horizontal plane on the side of the side wall. However, the said area 4 has stress relieving effect in cardboard material in all spots where deformation due to bending of the margin area away from the original plane of the blank has occurred.

The areas 4 of reduced bending stiffness, which can be designated “weaker areas”, are most conveniently formed by making the blank thinner, which automatically reduces the bending stiffness compared with the blank which has original thickness. The area 4 is of predetermined width, preferably over 1 mm and more preferably over 2 mm. Suitable width of the area is between 1-5 mm, preferably between 2.5-4.0 mm, but the area may be even wider. The width of the area 4 can be fixed for example by choice of the number of creasing blades that make the blank thinner. By using multiple parallel creasing blades any desired width of the area 4 can be obtained.

FIG. 2 shows also a horizontal edge flange or rim 6 extending outwardly from the upper edge of the side walls and surrounding the package. The flange 6 is formed separately from plastic material, for example thermoplastic polymer. Even though the flange 6 is not the same material as the cardboard blank, it can be fixed to the tray-type container during the same moulding operation where the container is formed. The flange can be made by injecting the material to a moulding cavity that is opened in a suitable moment in the press tool, as explained in the international publication WO 2009/074721. A lid 7 that is sealed to the upper surface of the flange 6 to close the package is designated by broken lines. The lid 7 is preferably made of cardboard whose lower surface has been coated with a material that is compatible with the material of the flange 6, for example for sealing the lid tightly and/or for allowing reclosability. The lid 7 may also be a plastic film comprising one or more layers and sealed to the upper surface of the flange 6. Such a film may be transparent so that the content of the package can be viewed without opening the package. It is also possible that the lid 7, irrespective of its material, is attached to the flange 6 mechanically only.

Even if the above-described package is particularly well suited for packaging of food in a tight manner which prevents diffusion of substances into and/or out of the closed package, it is also suitable for products other than food.

The shape of the blank and the resulting package need not necessary be rectangular. The shape can also be square where all sides have equal lengths. The shapes of other polygons are also possible. It is also possible that the blank and the package formed thereof has an oval shape.

The at least one area of reduced bending stiffness can also go uninterruptedly around the entire blank, surrounding its middle portion. Since the compression or forming of the area of reduced bending stiffness is preferably done at the same time as the forming of the score lines in the corner, it might not be possible to provide the corners with the areas of reduced bending stiffness in one process step. However, if the creases are formed in two steps it is possible to provide also the corners, i.e. the area with radially extended score lines, with areas of reduced bending stiffness.

The area/areas of reduced bending stiffness can be located either on the inside or on the outside of the package, because they will have similar effect on both locations. Thus, creasing can be performed on either side of the blank. In relation to FIG. 1, this means that the areas could be on the top side or on the bottom side of the blank. Furthermore, the invention can be applied both in packages made entirely of cardboard material and packages having a plastic rim described above. The invention is especially advantageous in cases where the shrinking of the plastic material of the rim in relation to the cardboard material causes the above-mentioned slight deformation problems in the moulded package.

It is contemplated that there are numerous modifications of the embodiments described herein, which are still within the scope of the invention as defined by the appended claims.

The invention claimed is:

1. A method for forming a package, wherein the package is moulded from a cardboard blank, the blank having straight sides and rounded corners, the blank comprising a margin area surrounding a middle portion, wherein the margin area is bent upwards to form side walls of the package while the middle portion forms the bottom of the package, comprising prior to moulding, providing the blank with at least two discontinuous areas of reduced bending stiffness compared to a bending stiffness of the middle portion, the at least two discontinuous areas of reduced bending stiffness being located around the middle portion of the blank, wherein the at least two discontinuous areas of reduced bending stiffness are formed as elongated areas that run parallel to the straight sides of the blank and are separated by at least one corner section and wherein the at least one corner section does not have an area of reduced bending stiffness, and molding the package from the blank so that the at least two discontinuous areas of reduced bending stiffness are located in a transition zone between the side walls and the bottom, where the blank is deformed due to moulding.

2. The method according to claim 1 wherein the at least two discontinuous areas of reduced bending stiffness are provided with a constant width of over 1 mm.

3. The method according to claim 1, wherein the at least two discontinuous areas of reduced bending stiffness are made in the blank by making the material of the blank thinner.

4. The method according to claim 3, wherein the at least two discontinuous areas of reduced bending stiffness are made by creasing.

5. The method according to claim 1, wherein a horizontal edge flange is formed on the upper edge of the sidewalls from a different material than the blank.

6. The method according to claim 5, wherein the horizontal edge flange is formed from plastic material.

7. The method according to claim 1 wherein the at least two discontinuous areas of reduced bending stiffness are provided with a constant width of over 2 mm.

8. The method according to claim 1 wherein the at least two discontinuous areas of reduced bending stiffness are provided with a constant width between 2.5-4.0 mm.

9. The method according to claim 1, wherein the package is provided with four discontinuous areas of reduced bending stiffness.

10. A package comprising a cardboard blank having a bottom and side walls extending upward from the bottom, the blank having straight sides and rounded corners, and at least two discontinuous areas of reduced bending stiffness compared to a bending stiffness of the bottom, the at least two discontinuous areas of reduced bending stiffness being located in a transition zone between the bottom and side walls of the package, wherein the at least two discontinuous areas of reduced bending stiffness are formed as elongated areas that run parallel to the straight sides of the blank and are separated by at least one corner section and wherein the at least one corner section does not have an area of reduced bending stiffness, and wherein the blank is deformed due to moulding.

11. The package according to claim 10, wherein the at least two discontinuous areas of reduced bending stiffness are areas of reduced thickness of the blank.

12. The package according to claim 10, wherein the at least two discontinuous areas of reduced bending stiffness have a constant width of over 1 mm.

13. The package according to claim 10, further comprising a horizontal edge flange formed on the upper edge of the sidewalls from a different material from the blank.

14. The package according to claim 13, wherein the horizontal edge flange is formed from plastic material.

15. The package according to claim 10 wherein the at least two discontinuous areas of reduced bending stiffness have a constant width of over 2 mm.

16. The package according to claim 10 wherein the at least two discontinuous areas of reduced bending stiffness have a constant width between 2.5-4.0 mm.

17. The package according to claim 10, wherein the package comprises four discontinuous areas of reduced bending stiffness.

18. The package of claim 17 wherein two of the discontinuous areas of reduced bending stiffness are on opposite sides of the bottom in a first direction and two of the discontinuous areas of reduced bending stiffness are on opposite sides of the bottom in a direction perpendicular to the first direction.

19. The package of claim 17 wherein there are four corner sections, the four corner sections not having an area of reduced bending stiffness, and wherein the four discontinuous areas of reduced bending stiffness are separated by the four corner sections.

20. The package of claim 10 wherein the at least two discontinuous areas of reduced bending stiffness are on opposite sides of the bottom.

21. A package blank of planar shape made of cardboard, the blank having straight sides and rounded corners, the blank comprising a middle portion and a margin area surrounding the middle portion, wherein the blank comprises at least two discontinuous areas of reduced bending stiffness compared to a bending stiffness of the middle portion, the at least two discontinuous areas of reduced bending stiffness being located around the middle portion of the blank in a transition zone between the middle portion and the margin area, wherein the at least two discontinuous areas of reduced bending stiffness are formed as elongated areas that run parallel to the straight sides of the blank and are separated by at least one corner section and wherein the at least one corner section does not have an area of reduced bending stiffness.

22. The package blank according to claim 21 wherein the at least two discontinuous areas of reduced bending stiffness have a constant width of over 1 mm.

23. The package blank according to claim 21 wherein the at least two discontinuous areas of reduced bending stiffness have a constant width of over 2 mm.

24. The package blank according to claim 21 wherein the at least two discontinuous areas of reduced bending stiffness have a constant width between 2.5-4.0 mm.

* * * * *